A. L. NICHOLSON.
END GATE.
APPLICATION FILED FEB. 16, 1915.

1,301,299.

Patented Apr. 22, 1919.

UNITED STATES PATENT OFFICE.

ALONZO L. NICHOLSON, OF ROCKWELL CITY, IOWA, ASSIGNOR OF ONE-HALF TO EDWIN W. BURCH, ONE-FOURTH TO ROBERT E. CONLEY, AND ONE-FOURTH TO HENRY A. MURPHY, ALL OF ROCKWELL CITY, IOWA.

END-GATE.

1,301,299.　　　　　Specification of Letters Patent.　　Patented Apr. 22, 1919.

Application filed February 16, 1915. Serial No. 8,645.

*To all whom it may concern:*

Be it known that I, ALONZO L. NICHOLSON, a citizen of the United States, and resident of Rockwell City, in the county of Calhoun and State of Iowa, have invented a certain new and useful End-Gate, of which the following is a specification.

The object of my invention is to provide an end gate for wagons and the like of simple, durable and inexpensive construction.

More particularly it is my object to provide an end gate of the type having two members, one being superposed above the other vertical member, the lower end gate member being adapted to swing rearwardly and upwardly.

Still a further object is to provide such an end gate having a simple and inexpensive lock and controlling mechanism, whereby the lower end gate member may be swung rearwardly at its upper edge, and slid upwardly for leaving a small opening at the lower edge of the movable end gate member, the parts being so constructed and arranged as to enable the operator to swing the lower end gate member rearwardly if desired, and to then permit the lower end gate member to be swung upwardly.

Still a further object is to provide such an end gate so constructed and arranged that the lower part may be slid upwardly with relation to the upper part without permitting any of the contents of the wagon bed to escape at the side of the end gate.

My invention consists in the construction, arrangement, and combination of the various parts of the device, whereby the objects contemplated are attained, as more fully set forth, pointed out in my claims, and illustrated in the accompanying drawing in which:

Figure 1:
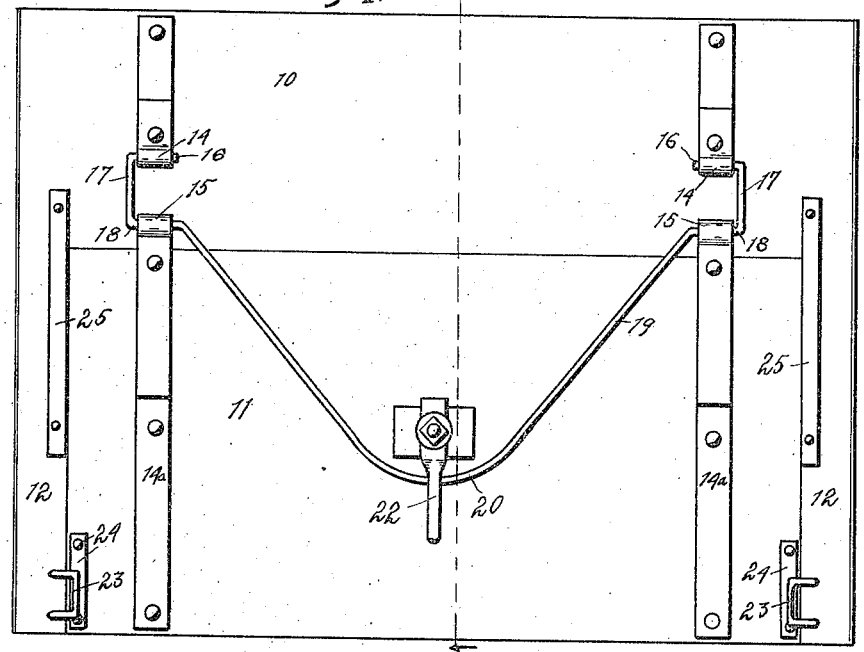
Figure 1 shows a rear elevation of an end gate embodying my invention.

In the accompanying drawings, I have used the reference numeral 10 to indicate the upper end gate member, to which the lower end gate member 11 is connected in the manner hereinafter described. Below the ends of the end gate member 10 are downwardly extending members 12, which may be mounted on or formed on the member 10. The members 12 and the ends of the member 10 are adapted to be slidably received between the cleats at the rear end of an ordinary wagon bed. In this connection it may be mentioned that the end gate members 10 and 11 may be of any desired width.

Figure 2:
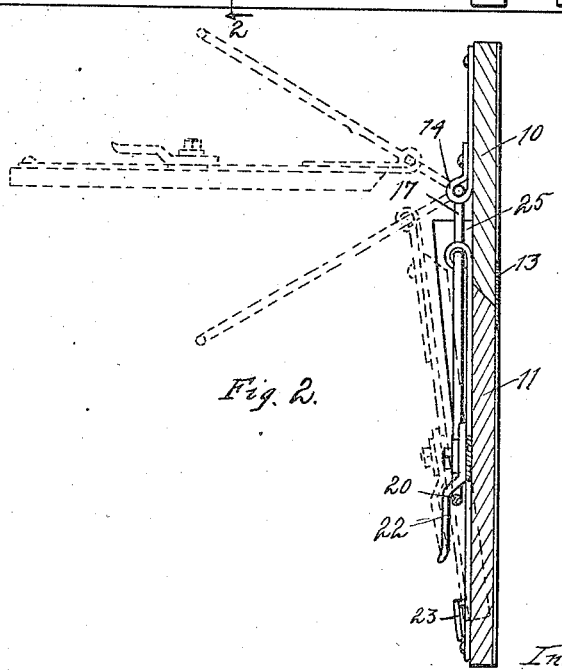
Fig. 2 shows a vertical view of the same taken on the line 2—2 of Fig. 1.

The lower edge of the upper end gate member, and the upper edge of the lower end gate member are beveled from their rear surfaces downwardly and inwardly, as shown in Fig. 2. Secured to the inner surface of the upper end gate member 10 at the lower edge thereof, is a plate 13, which extends downwardly and overlaps the upper edge of the lower end gate member 11. The adjacent edges of the members 10 and 11 are beveled, as described, and provided with the overlapped plate 13 for making a grain tight joint, when the end gate is in its closed position.

Mounted on the rear surfaces of the upper end gate member 10 are alined bearings 14. Mounted on the member 11 are vertical straps of iron $14^a$, which extend upwardly above the upper edge of the member 11, and have horizontally alined bearings 15 at their upper ends.

In each bearing 14 is a horizontal shaft member 16, formed on one end of which is a downward extension 17. Formed on the lower end of each extension 17 is a horizontal shaft member 18 mounted in one of the bearings 15, as clearly illustrated in Fig. 1.

Formed integrally with the inner ends of the shaft members 18 is a rod 19, which is inclined downwardly and toward the middle of the lower end gate member from the respective shaft members 18. The lower central portion of the rod 19 is curved at 20, as shown in Fig. 1.

Pivoted to the end gate member 11 is a locking arm 22, adapted, when the member 20 is in its lowered position adjacent to the member 11 to extend over the portion 20 receiving the same between said arm 22, and the end gate member 11 for locking the lower movable end gate member in its closed position.

Mounted on the downwardly extending members 12 near their lower ends are keepers 23, which are spaced from and overlap the side edges of the member 11. The keepers 23 may be of suitable length from top to bottom, and their upper portions are spaced farther from the member 11 than their lower portions, for the reason that will be explained in setting forth the practical operation of my improved end gate.

Wear-plates 24 are countersunk in the rear surface of the end gate member 11, adjacent to the keepers 23 in position to take the wear of said keepers. Secured to the rear surfaces of the members 12 and extending upwardly and overlapping the lower part of the member 10 are guard devices 25, which extend adjacent to the edges of the member 11 and are adapted to prevent grain from flowing out sidewise when the member 11 is raised upwardly. The members 25 are wider from front to rear at their upper ends than at their lower ends, as shown in Fig. 2.

In the practical use and operation of my improved end gate, the members 12 and the edges of the member 10 are placed between the cleats at the rear end of an ordinary wagon bed. The member 20 is swung to its lowermost position, adjacent to the member 11, and is locked in such position by means of the arm 22. The lower part of the keeper 23 engages the wear-plate 24 and holds the member 11 against swinging rearwardly. When it is desired, for instance, to open a small space at the lower side of the member 11, the member 22 is rotated to clear the member 20, which portion is then swung rearwardly and upwardly. It will readily be seen that the bearings 15 and the upper side of the member 11 are then swung rearwardly and slid upwardly to the position shown by the dotted lines in the lower portion of Fig. 2.

It will be seen that the adjacent edges of the members 10 and 11 are beveled, as hereinbefore described, to readily permit the last described movement of the member 11.

On account of the fact that the upper ends of the keepers 23 are spaced farther from the members 12 than the lower ends, the outward swinging movement of the upper end of the member 11 is permitted. At the same time the lower part of the member 11 is held against any rearward swinging movement during the first part of its sliding movement. After the first movement of the member 11, just described, a space is left in the bottom of the wagon bed through which small grain may flow from the wagon bed. The members 25 prevent any escape of grain at the side of the movable end gate member.

By continuing the upward swinging movement of the members 19, the end gate member 11 is raised until its lower edge clears the keepers 23. The lower part of the end gate member will then tend to swing outwardly from the wagon bed, and it may be tilted upwardly to position shown by the upper dotted lines in Fig. 2 or may be tilted and raised against the member 10. It will thus be seen that my improved end gate is especially adapted for use in farmers' elevators and the like where it is desired to avoid any escape of grain from the ends of the end gate, and is also adapted for use in any place where it is desired to accurately limit the flow of grain or other contents from the wagon bed.

The space below the lower edge of the movable end gate member may be accurately regulated, and in this connection attention is called to the fact that the form of the shaft members, and the members 19 and 20 is such as to give the operator a large leverage in giving to the member 11 its first upward movement.

I am aware that numerous changes may be made in the details of the construction of my improved end gate, and I have built end gates in which numerous changes have occurred, and it is my intention to cover by this application any such changes in the arrangement and construction of the parts which are included within the scope of my claims.

I claim as my invention:

1. In a device of the type set forth, the combination with a main gate structure having a pair of laterally spaced depending side extensions unconnected at their lower ends and adapted to form an opening immediately over the floor of a wagon box through which the grain may have clear passage, of an auxiliary gate set in said opening between said depending side members, a bail member having its ends formed into bearing links for hingedly securing said main and auxiliary gates together, so that the auxiliary gate member will in closed position rest on the floor of the wagon box and in opening swing outwardly and upwardly at its upper end, a pair of pocket members having upwardly and outwardly slanting guide surfaces carried by the lower portion of the main gate structure adjoining the lower corners of said opening by which the lower corners of the auxiliary gate may be movably held to assist in holding said movable member in closed position and means secured on the outer face of said movable member adapted to releasably engage said bail member to coöperate with said pocket members and assist in locking the auxiliary gate closed.

2. An end gate having an upper central portion, downwardly extending members at the ends thereof, a lower central movable member between said last members, horizontally alined hinge leaves on said first member, reinforcing hinge leaves on said movable member having portions extending above said lower central member forming horizontally alined bearings in vertical alinement with said first mentioned leaves, a bail having vertically arranged pairs of horizontal offsets near its ends journaled in said vertically alined leaves and a central body portion curved downwardly over the movable member, pocket members for holding the lower corners of the movable gate member closed, means on said movable gate member and coöperating with said pocket member for locking said movable gate member on the body portion of said bail and wear plates on said movable gate member within said pocket members.

Des Moines, Iowa, January 13, 1915.

ALONZO L. NICHOLSON.

Witnesses:
A. SHERMAN,
J. MAHER.